(12) United States Patent
Tanaka

(10) Patent No.: US 6,428,212 B1
(45) Date of Patent: Aug. 6, 2002

(54) LUBRICATING STRUCTURE OF BEARING

(75) Inventor: Sadayuki Tanaka, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/615,717

(22) Filed: Jul. 13, 2000

(30) Foreign Application Priority Data

Jul. 16, 1999 (JP) ............................................ 11-203558

(51) Int. Cl.[7] ............................................... F16C 33/66
(52) U.S. Cl. ..................................... 384/475; 384/486
(58) Field of Search ................................ 384/462, 466, 384/468, 471, 473, 474, 475, 477, 484, 486, 571

(56) References Cited

U.S. PATENT DOCUMENTS

| | | | | |
|---|---|---|---|---|
| 1,957,054 A | * | 5/1934 | Waldorf | 384/474 |
| 3,885,842 A | * | 5/1975 | Furutsu | 384/468 |
| 5,253,733 A | * | 10/1993 | Miyachi | 384/474 |
| 5,362,159 A | * | 11/1994 | Kufner et al. | 384/484 |
| 5,642,946 A | * | 7/1997 | Caillault et al. | 384/486 |

FOREIGN PATENT DOCUMENTS

| | | | | |
|---|---|---|---|---|
| GB | 2 323 132 | | 9/1998 | |
| JP | 61-12130 | | 4/1986 | |
| JP | 2209624 A | * | 8/1990 | 384/474 |
| JP | 2522930 | | 10/1996 | |
| JP | 10-252760 | | 9/1998 | |

* cited by examiner

Primary Examiner—Thomas R. Hannon
(74) Attorney, Agent, or Firm—Miles & Stockbridge P.C.

(57) ABSTRACT

A lubricating structure of a bearing for lubricating a bearing by supplying oil air which is transmitted with pressure through respective distribution passages of an oil air distributor from an oil air supply apparatus to the bearing, comprising a first lubrication route for supplying the oil air to the bearing to lubricate inner portion of the bearing; and a second lubrication route for supplying the oil air to the bearing, and leading this oil air to a fit portion between the internal diameter surface of the inner race and the shaft portion through a seal member having a predetermined void portion, thereby lubricating this fit portion.

2 Claims, 13 Drawing Sheets

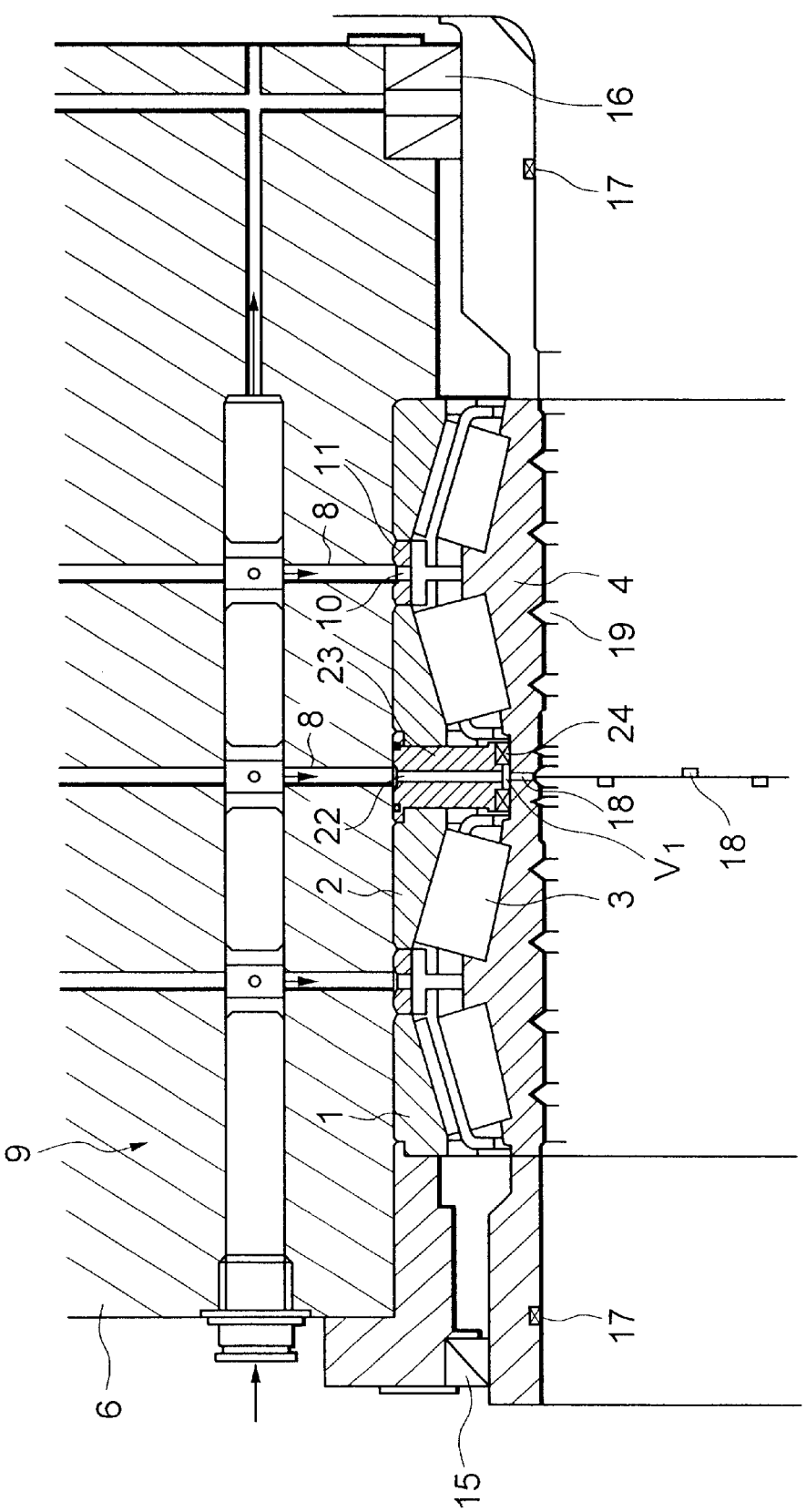

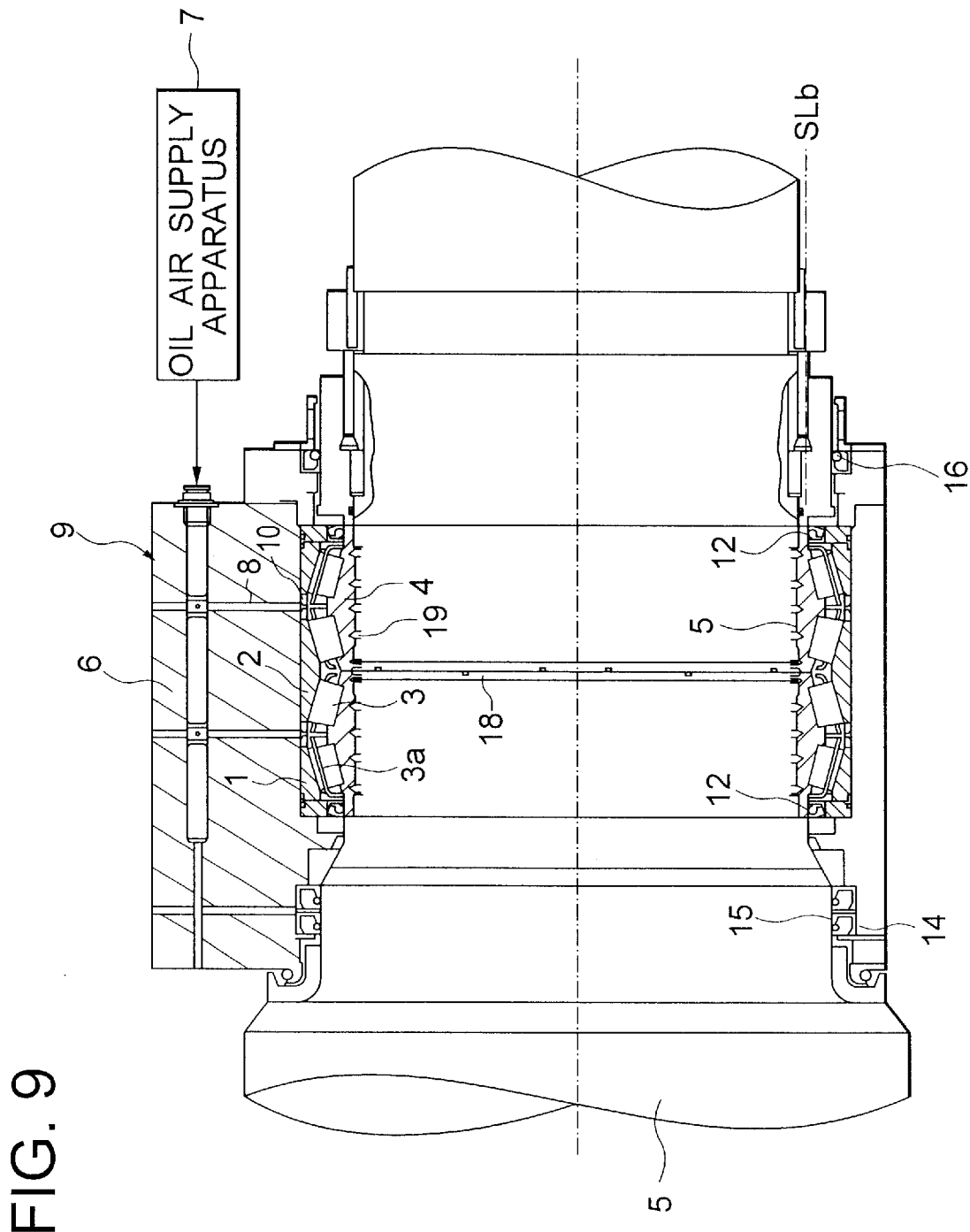

LUBRICATING STRUCTURE OF BEARING

This application claims the benefits of Japanese Application No. 11-203558 which is hereby incorporated by reference.

BACKGROUND OF THE INVENTION

1. Field of the Invention

The present invention relates, for example, to a lubricating structure of a roll neck bearing which is used in a rolling mill of steel manufacturing facility, and more specifically, to a lubricating structure of a bearing which can prevent wear or scoring in a fit portion between the internal diameter surface of an inner race and a roll neck portion (shaft portion) of the bearing by supplying oil air with certainty.

2. Related Background Art

For example, a roll neck bearing for a rolling mill is used for a work roll or an intermediate roll of a hot rolling mill or a cold rolling mill of steel manufacturing facility. In such a roll neck bearing, clearance fit (loose fit) is often employed between the bearing and the roll in order to facilitate rearrangement of the bearing and the roll.

In such a case, when the roller is rotated in a fit portion between the internal diameter of the inner race of the bearing and the roll neck portion (shaft portion), a creep is created with a slight sliding due to a diametrical difference, thereby bringing about wear or scoring. Consequently, it is required to supply lubricating oil for preventing damages. Thus, oil air lubrication for feeding oil with pressure using compressed air is conducted in the fit portion between the internal diameter of the inner race of this bearing and the roll neck portion (shaft portion).

In a sealed four row tapered roller bearing in this roll neck bearing assembly, double row inner races 4 are provided on the internal diameter side of outer races 1 and a double row outer race 2 through tapered rollers as rolling elements 3, as shown in FIG. 9 and FIG. 10. The rolling elements 3 are properly retained by retainers 3a. On the internal diameter side of this double row inner race 4, the roll neck portion (shaft portion) 5 of the roll is clearance fitted (loose fitted).

A chock 6 is provided on the outer diameter side of the outer races 1 and on the double row outer race 2. This chock 6 is provided with an oil air distributor 9 which is comprised of a plurality of distribution passages 8 for distributing the oil air supplied from an oil air supply apparatus 7.

Between each outer race 1 and the double row outer race 2, an outer race spacer ring 11 having an oil bore 10 communicating with the distribution passage 8 is interposed. Oil seals 12 are provided on both of the outer sides of the double row inner races 4, respectively. An intermediate seal 13 is provided on the inner sides of the double row inner races 4. Further, there are provided a dust seal 14, a chock seal 15 on the barrel side, a chock seal 16 on the shaft end side, and a shaft seal 17. An oil bore 18 is formed on the end surface of each double row inner race 4, while an oil groove 19 is formed on the internal diameter surface of each double row inner race end surface 4.

In such a sealed four row tapered rolling bearing, when oil air is supplied from the oil air supply apparatus 7 to the oil air distributor 9 by using compressed air, the oil air flows in a bearing void portion V0 on the internal diameter side of the oil bore 10 of the outer race spacer ring 11 through this oil bore 10.

Since the bearing void portion V0 has a comparatively large capacity, the air oil reaching this bearing void portion V0 reduces its pressure to be expanded and the air flowing speed thereof is decreased at the same time, the oil and the air are separated from a convey state of a gas-liquid two phase flow, and only the oil advances into the inner portions of the bearing, for example, in the environs of the rolling elements 3.

The oil thus advancing in the inner portion of the bearing reaches a lower portion of the bearing by gravity, remains at the height level of the oil seals 12 (SLb), and is exhausted from the portion of the oil seals 12 little by little. However, an amount of the supplied oil and an amount of the exhausted oil is balanced in the portion of this oil seal 12, so that the height level of the oil of the oil seal 12 (SLb) is maintained at the same level all the time.

On the other hand, the air separated from the state of gas-liquid two phase flow in the bearing void portion V0 is sealed within the bearing at the pressure of 0.1 to 0.3 bars or around by the oil seals 12 provided at the both ends of the bearing and the intermediate seal 13 provided in the middle of the bearing, and flows into the fit portion between the internal diameter surface of the inner race 4 and the roll neck portion (shaft portion) 5 from the oil seals 12 and the intermediate seal 13 through the inner race end surface oil bore 18.

However, it becomes difficult to supply the oil to this fit portion since the air flow speed (pressure) of this air decelerates in the bearing void portion V0 and the air has not sufficient flow speed or pressure to send the oil in this fit portion. When the bearing is used for a long time, it is feared that creep is created in this fit portion to cause wear or scoring.

A four row tapered rolling bearing in the roll neck bearing is substantially the same as the sealed four row tapered rolling bearing described above, as shown in FIG. 11. However, the former is different from the latter chiefly in that oil seals are not provided at the both ends of the bearing.

As described above, since there are no oil seals, the oil invading in the inner portion of the bearing reaches a lower portion of the bearing by gravity, and remains at the height level of the internal diameter surface of the outer races 1 and 2 (Ax) or the height level of the chock seals 15 and 16 (SLc). After that, the oil is exhausted little by little while keeping the balance with the supplied amount thereof.

Also, the air separated in the bearing void portion V0 has a low pressure in the bearing since no oil seal is provided and hardly flows into the fit portion between the internal diameter surface of the inner race 4 and the roll neck portion (shaft portion) 5. Thus, it becomes difficult to supply the oil to this fit portion, and when the bearing is used for a long time, a creep may be created in this fit portion to cause wear or scoring.

Incidentally, assuming that there is a chamber (space) when the oil air is conveyed at the flow speed of 6 m/s (the flow speed capable of conveying the oil) or higher, as shown in FIG. 12, the oil air advancing into this chamber reduces its flow speed (pressure) to be expanded, whereupon the flow speed decelerates to 6 m/s or lower so that the oil air is separated into air and oil. The separated oil remains as it is inside the chamber, and only the air flows out from the chamber through an outlet. However, if this state continues, the oil remains up to the level of the outlet inside the chamber, and a more pressure loss is generated in the air due to the viscous resistance of the oil, so that the air hardly flows out.

Consequently, in order to convey the oil air to the predetermined destination (the fit portion between the internal diameter surface of the inner race 4 and the roll neck portion 5), it is preferable to provide in a convey path (supply path) thereof no such a chamber (space) which may bring about a great change in the capacity. Even if it is inevitably required to provide a chamber, it is preferable to reduce the capacity of the chamber to the minimum so that reduction of the pressure or the flow speed of the oil air is suppressed within an appropriate range.

In addition, though the oil air lubrication is conducted in the above-described roll neck bearing shown in FIG. 9 to FIG. 11, grease lubrication is conducted in some cases, as shown in FIG. 13.

In this grease lubrication, grease is supplied to the fit portion between the internal diameter surface of the inner race 4 and the roll neck portion 5, so that it is arranged to send the grease by pressure to an intermediate portion of the bearing. That is, a center spacer ring 23 having a center oil bore 22 is provided on a double row outer race 2, and intermediate seals 24 having a comparatively large seal void portion V1 is interposed on the internal diameter side of this center spacer 23. Further, an inner race spacer ring 26 having an oil groove 25 is provided between the inner races 4.

In grease lubrication, it is required to send grease with a high pressure (5 to 10 bars or around) from a grease supply apparatus 21 and to endure a comparatively large pressure. As a result, the intermediate seals 24 are arranged to have a high rigidity and a large cross section. Thereupon, the seal void portion V1 between the intermediate seals 24 is arranged to be larger than the bearing void portion V0.

In the structure for such grease lubrication shown in FIG. 13, if it is assumed that oil air lubrication is conducted in an intermediate portion of the bearing, the oil air which reaches the seal void portion V1 through the oil bore 22 of the center spacer ring 23 reduces its pressure to be expanded and, at the same time, the air flow speed thereof decelerates since the capacity of the seal void portion V1 is comparatively large. As a result, the oil and the air are separated from each other and, while the oil remains inside the seal void portion V1, only the air is supplied to the fit portion between the internal diameter surface of the inner race 4 and the roll neck portion 5 through the inner race spacer oil bore 25.

In this case, if the oil fills the seal void portion V1, the oil must be supplied to the fit portion between the internal diameter surface of the inner race 4 and the roll neck portion 5 through the inner race spacer oil bore 25, However, when the oil fills the seal void portion V1 which has a comparatively large capacity, a more pressure loss is generated in the air due to the viscous resistance of the oil, as explained with reference to FIG. 12. Moreover, the pressure of the supplied oil air is lower than that in the case of the grease lubrication, to be 0.1 to 0.3 bars. As described, the flow speed or pressure of the air is not sufficiently high to send the oil to the fit portion, so that it is difficult to supply the oil to this fit portion. In addition, if this bearing is used for a long period of time, creep may be generated in this fit portion, thereby causing wear or scoring.

The plurality of distribution passages of the oil air distributor can distribute the oil air more correctly, when the pressure losses of the respective distribution passages are more equivalent to each other. However, when the pressure loss of the seal void portion V1 of the intermediate seal portion becomes large, the oil air sometimes escapes to other distribution passages so that the oil air may not be distributed to the respective distribution passages correctly.

Further, an amount of supply of the oil air for an ordinary roll neck bearing is, though depending on the condition of use or the size of the bearing, about 3 to 10 cc per hour for a bearing of a work roll or an intermediate roll. Taking into consideration that around a third of such supplied oil air is supplied to the roll neck portion 5, it may require several ten to hundred and several ten hours until the oil fills the capacity (V1). As a result, during such period, only the air flows into the roll neck portion and no oil is supplied, so that the above-described problems may arise if the time of use of the bearing (from the start to the completion of rolling) is long.

SUMMARY OF THE INVENTION

The present invention was contrived taking the circumstances mentioned above into consideration, and the object of the invention is to provide a lubricating structure of a bearing which can prevent wear or scoring in a fit portion between the internal diameter surface of the inner race and the roll neck portion (shaft portion) by supplying oil air to the fit portion with certainty.

In order to achieve the above object, the present invention provides a lubricating structure for lubricating a bearing by supplying oil air which is transmitted with pressure through respective distribution passages of an oil air distributor from an oil air supply apparatus to the bearing, comprising:

a first lubrication route for supplying the oil air to the bearing to lubricate the inner parts of the bearing; and a second lubrication route for supplying the oil air to the bearing, and leading this oil air to a fit portion between the internal diameter surface of the inner race and the shaft portion through a seal member having a predetermined void portion, thereby lubricating this fit portion.

As described above, according to the present invention, the supply of the oil air to the inner portion of the bearing, such as the environs of rolling elements, is conducted by the first lubrication route, while the supply of the oil air to the fit portion between the internal diameter surface of the inner race and the shaft portion is conducted by the second lubrication route. Consequently, it is possible to supply the oil air to the fit portion so as to prevent wear or scoring in the fit portion.

Moreover, a seal member having a predetermined void portion is interposed in the second lubrication route, and the capacity of this seal void portion is made to be conspicuously small, compared to the conventional one. As a result, the pressure of the oil air which flows in this seal void portion is hardly reduced, and the flow speed of the oil air is hardly decelerated to be lower than a level capable of conveying the oil (for example, 6 m/s or higher). Further, the oil and the air are seldom separated from each other and, unlike in the conventional art, a pressure loss in the air due to the viscous resistance of the oil which fills the seal void portion is not generated. Accordingly, the oil air can be supplied to the fit portion with certainty through the second lubrication route, and the oil air can be correctly distributed also through the respective distribution passages of the oil distributor.

With the structure described above, it is possible to supply the oil air to the fit portion of the internal diameter surface of the inner race and the shaft portion with certainty, and to prevent wear or scoring. in the fit portion, thereby ensuring a long-term use of the bearing.

Since the oil air reaching the void portion of the seal member flows with certainty into the fit portion through an oil groove formed on the end surface of the inner race, the pressure of the oil air may be small to be, e.g., 0.1 to 0.3 bars or smaller, and the seal member may have a small cross section with light contacting performance and a low rigidity. As a result, it is possible to design a seal holder with a smaller space, compared with one for conventional grease lubrication, thereby improving the load capacity of the bearing.

BRIEF DESCRIPTION OF THE DRAWINGS

FIG. 7 is a longitudinal sectional view of a four row tapered roller bearing of a roll neck bearing assembly according to the sixth embodiment of the present invention.

FIG. 9 is a longitudinal sectional view a sealed four row tapered roller bearing of a roll neck bearing assembly according to the prior art.

DESCRIPTION OF THE PREFERRED EMBODIMENTS

Description will be made below on a lubricating structure of a bearing according to preferred embodiments of the present invention with reference to the drawings.

Figure 1:
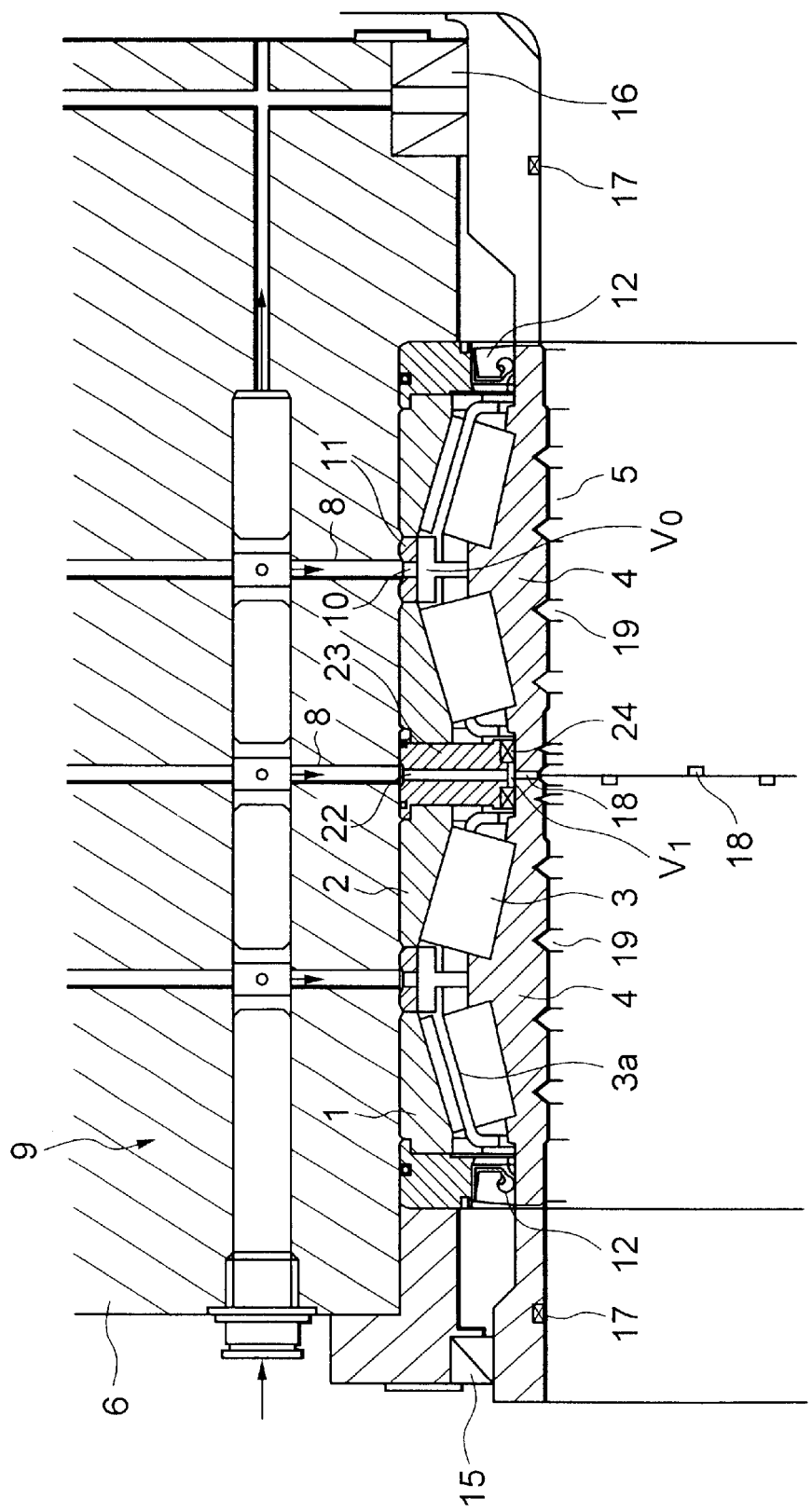
FIG. 1 is a longitudinal sectional view of a sealed four row tapered roller bearing of a roll neck bearing assembly according to the first embodiment of the present invention.
Figure 2:
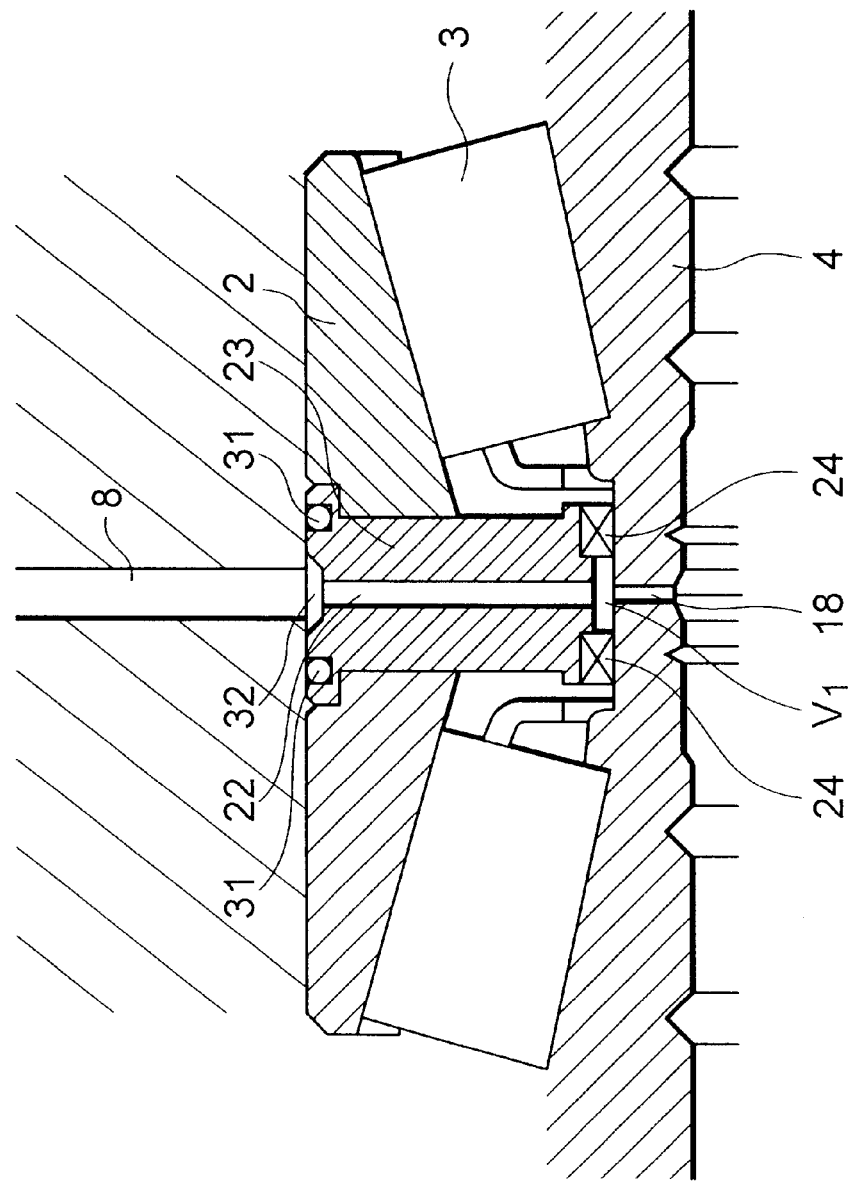
FIG. 2 is an enlarged sectional view of the essential portion of the sealed four row tapered roller bearing of the roll neck bearing shown in FIG. 1.

FIG. 1 is a longitudinal sectional view of a roll neck bearing according to a first embodiment of the present invention. FIG. 2 is an enlarged sectional view of the essential portion of the roll neck bearing shown in FIG. 1.

A sealed four row tapered rolling bearing of a roll neck bearing assembly according to the first embodiment is provided with double row inner races 4 on the internal diameter side of the outer races 1 and a double row outer races 2 through rolling elements 3 which are tapered rollers, as shown in FIG. 1, and each rolling element 3 is appropriately retained by a retainer 3a. On the internal diameter side of the double row inner races 4, a roll neck portion (shaft portion) 5 of the roll is fitted by clearance fit (loose fit).

On the outer diameter side of the outer races 1 and the double row outer races 2, there is provided a chock 6, and this chock 6 is provided with an oil air distributor 9 which is formed with a plurality of distribution passages 8 for distributing the oil air supplied from an oil air supply apparatus 7.

An outer race spacer ring 11 which has an oil bore 10 communicating with this distribution passage 8 is interposed between the outer race 1 and the double row outer race 2. Oil seals 12 are provided on both of the outer sides of the double row inner races 4, respectively. There are further provided a dust seal 14, a chock seal 15 on the barrel side, a chock seal 16 on the shaft end side, and a shaft seal 17. An oil bore 18 is formed on the end surface of each double row inner race 4, and an oil groove 19 is formed on the internal diameter surface of each double row inner race 4.

Further, in order to supply the oil air to a fit portion between the internal diameter surface of each inner race 4 and the roll neck portion 5, it is arranged to send the oil air by pressure to an intermediate portion of the bearing. That is, as shown in FIG. 2, the double row outer race 2 is provided with a center spacer ring 23 (seal holder) having an oil bore 22 connected to the distribution passage 8. On the internal diameter side of this center spacer 23, intermediate seals 24 forming a comparatively small void portion V1 is disposed.

Further, the center spacer (seal holder) 23 described above is provided with elastic seals 31 on the outer diameter side thereof, so as to prevent leakage of the oil air from the distribution passage 8. A circumferential groove 32 is formed on the outer diameter surface of this center spacer 23. At least one center spacer oil bore 22 communicating with the void portion V1 is provided on the circumference, in accordance with the air flow speed, with a sufficient diameter size ($\phi$ 2 mm to $\phi$ 10 mm) or around to ensure such air flow speed as capable of conveying the oil air.

Since the pressure in the second lubrication route from the distribution passage 8 to the internal diameter surfaces of the inner races (which is described later) is 0.1 to 0.3 bars or less, there arises no problem if each intermediate seal 24 has a small cross section and low rigidity, and it is possible to provide the seal designed to have a smaller space.

Figure 8C:
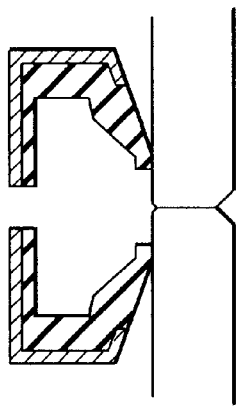
FIGS. 8A to 8F sectional views for showing variations of a intermediate seal.
Figure 8F:
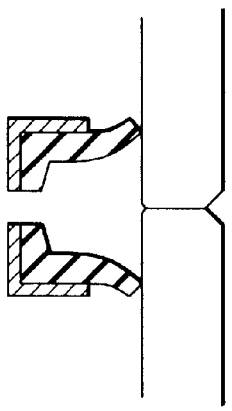
Figure 8B:
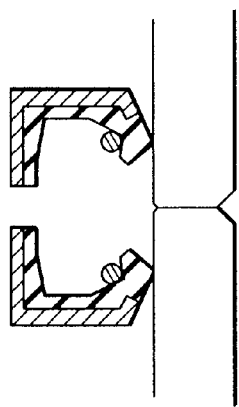
Figure 8E:
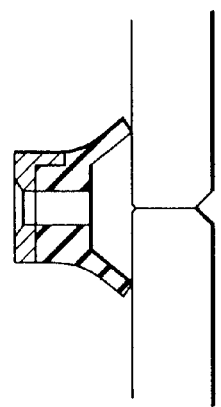
Figure 8A:
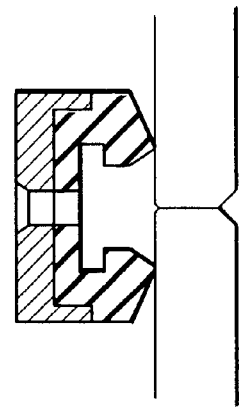
Figure 8D:
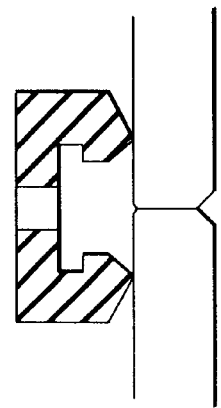
Figure 10:
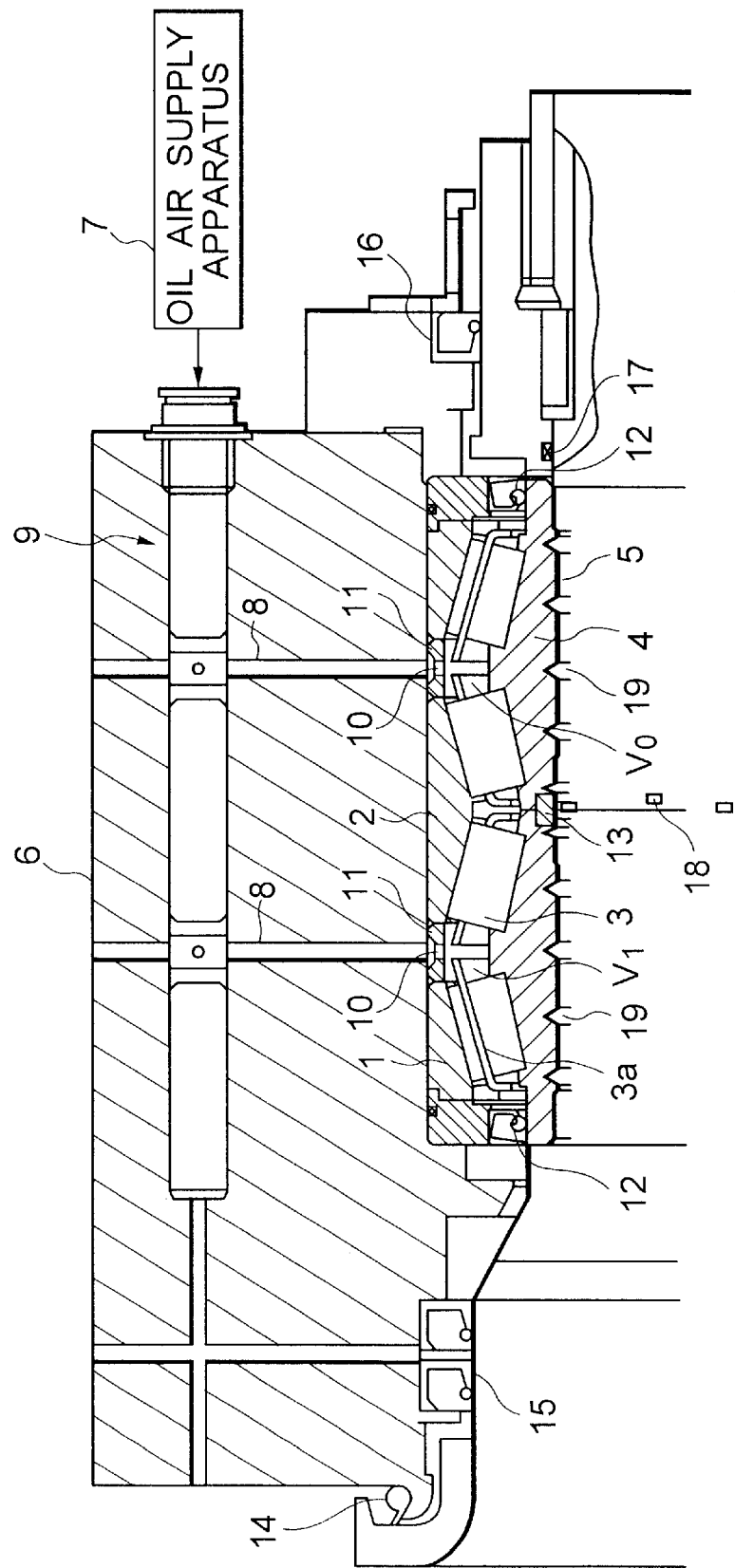
FIG. 10 is an enlarged sectional view of the essential portion of the sealed four row tapered roller bearing shown in FIG. 9.
Figure 11:
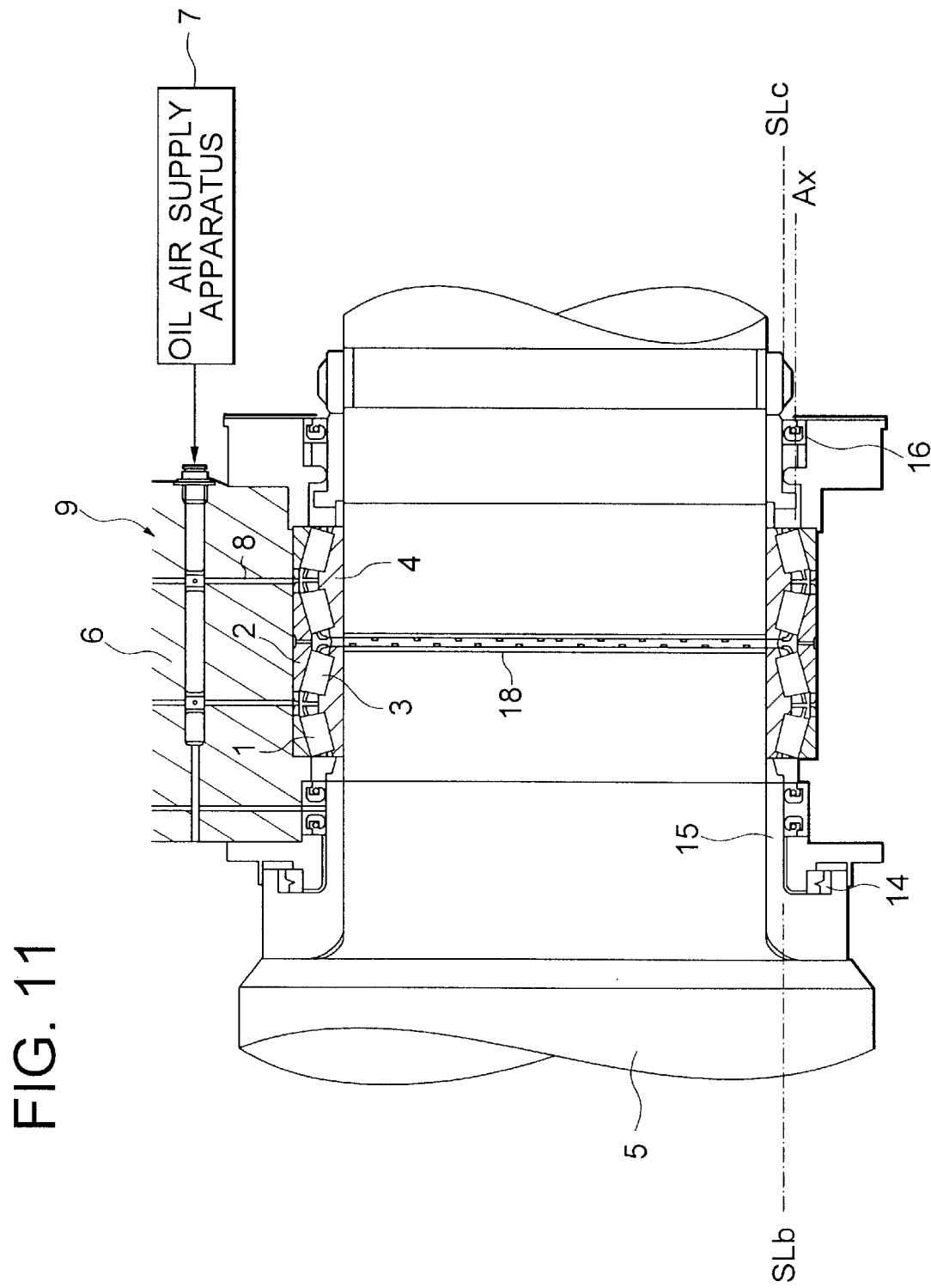
FIG. 11 is a longitudinal sectional view of a four row tapered roller bearing of a roll neck bearing according to the prior art.
Figure 12:
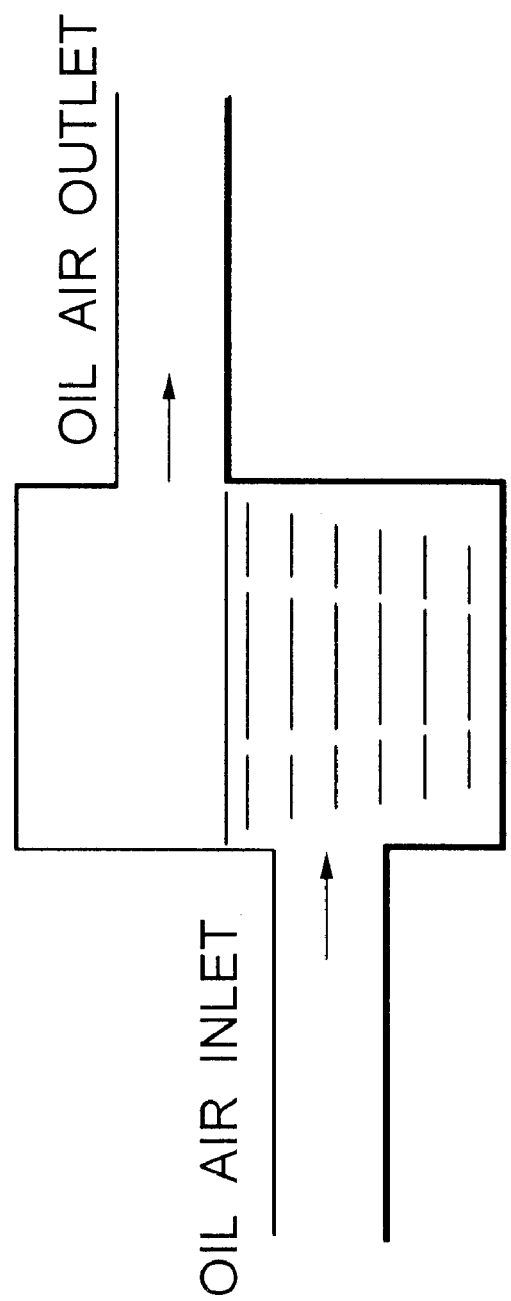
FIG. 12 is a view for explaining the flow of oil air.
Figure 13:
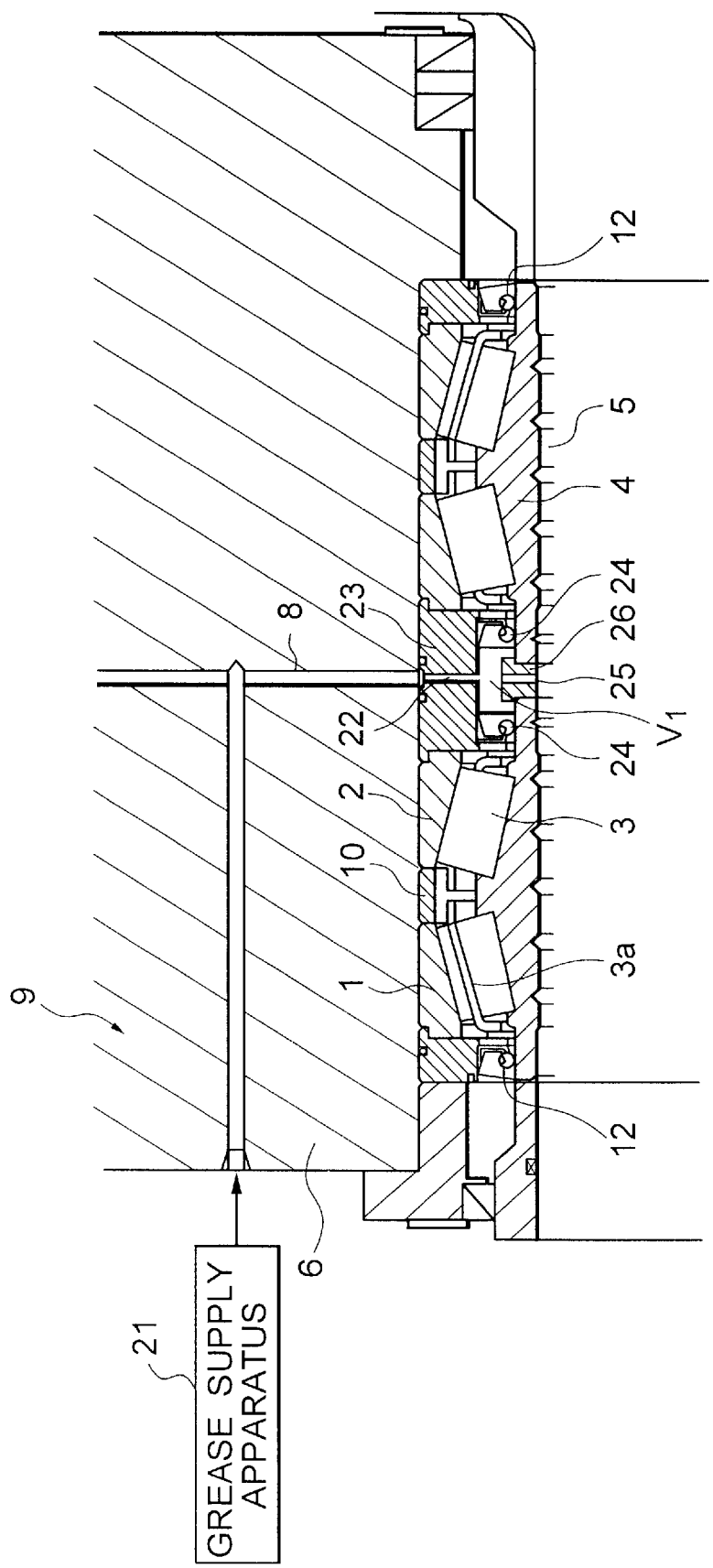
FIG. 13 is a longitudinal sectional view of a sealed four row tapered roller bearing of a roll neck bearing for conducting grease lubrication.

Though the form of the intermediate seal 24 is not particularly limited, examples thereof are shown in FIG. 8A to FIG. 8F. As shown in FIG. 8A, the intermediate seal 24 may comprises a rubber elastic member and a metallic ring provided thereon, or as shown in FIG. 8B, a metallic ring may be fitted on a side surface of the rubber elastic member. Also, as shown in FIG. 8C, lip portions of a rubber elastic member may be extended long, or as shown in FIG. 8D, the intermediate seal 24 may be formed only from a rubber elastic member, or as shown in FIG. 8E, it may be comprised of a rubber elastic member and a metallic ring provided thereon, and the lip portions of the rubber elastic member may be extended outward. Or, as shown in FIG. 8F, the intermediate seal 24 may be comprised of a rubber elastic member and a metallic ring provide thereupon, with the lip portions extended outwardly, and this metallic ring may also cover the side surfaces of the elastic member. Further, as a material for the intermediate seal 24, a material composed of rubber having large elasticity (nitrile rubber, acrylic rubber, or fluorinated rubber) is employed. Further, the form of the seal void portion V1 formed by the intermediate seal 24 varies depending on the size of the bearing, etc., and is not limited, so long that a cross section thereof is large enough to ensure a flow speed at least not blocking the conveyance of the oil air.

The lubricating structure of the roll neck bearing arranged as described above is arranged such that the supply of the oil air to the inner portions of the bearing such as the environs of the rolling elements 3 (the first lubrication route) is conducted through the oil bore 11 of the outer spacer ring 10, while the supply of the oil air to the fit portion between the internal diameter surface of the inner race 4 and the roll neck portion (shaft portion) (the second lubrication route) is conducted through the oil bore 22 of the center spacer ring 23 and through the inner race end surface oil bore 18 which communicates with the center spacer ring oil bore 22 through the seal void portion V1 and opens to the inner surface of the inner race 4. A cross-section area A of the center spacer ring oil bore 22 and the inner race end surface oil bore 18 composing the second lubricating route satisfies the following formula:

$$V = Q/A \geq 6 \text{ m/s}$$

where V is a velocity of the oil air in the oil bore 18 or 22; and Q is an amount of the oil air supplied through the oil air passage 8 from the oil air distributor, so that the velocity of the oil air by which oil may be transferred without separating oil and air, may be maintained.

In this first lubrication route, when the oil air is supplied from the oil air supply apparatus 7 to the oil air distributor 9 by compressed air, the oil air flows into the bearing void portion V0 on the internal diameter side of the oil bore 10 of the outer race spacer ring 11 through the respective distribution passages 8 and through the outer race spacer oil bores 10.

The bearing void portion V0 has a comparatively large capacity, so that the oil air reaching this bearing void portion V0 reduces its pressure to be expanded and, at the same time, the flow speed of the oil air is decelerated. Thus, the oil and the air are separated from the gas-liquid two phase flow state, and only the oil advances to the inner portions of the bearing, such as the environs of the rolling elements 3.

The oil thus advancing into the inner portions of the bearing reaches a lower portion of the bearing by gravity, remains at the height level of the oil seal 12 (SLb), and is exhausted through the portion of this oil seal 12 little by little. However, in the portion of this oil seal 12, an amount of the supplied oil and an amount of the exhausted oil are balanced with each other, so that the height level of the oil seal 12 (SLb) is fixed at all times.

On the other hand, in the second lubrication route, when the oil air is supplied from the oil air supply apparatus 7 to the oil air distributor 9 by the compressed air, the oil air goes through the respective distribution passages 8 and the oil bore 22 of the center spacer ring 23 to reach the seal void portion V1.

In the present embodiment, the capacity of the seal void portion V1 is made conspicuously small, compared with that of the prior art, so that the pressure of the oil air flowing in this seal void portion V1 hardly decreases, and the flow speed of the oil air hardly decelerates to be lower than the level capable of conveying the oil (for example, 6 m/s or higher). Further, the oil and the air are seldom separated from each other, so that, unlike in the conventional example, there is no pressure loss in the air due to the viscous resistance of the oil which fills the seal void portion V1.

Accordingly, it is possible to supply the oil air from the seal void portion V1 to the fit portion between the internal diameter surface of the inner race 4 and the roll neck portion 5 through the inner race end surface oil bore 18. In this manner, it is possible to securely supply the oil air to the fit portion through the second lubrication route, and it is possible to correctly distribute the oil air also through the respective distribution passages 8 of the oil distributor 9. As a result, it is possible to prevent wear or scoring in the fit portion, so as to ensure a long-term use of the bearing.

Figure 3:
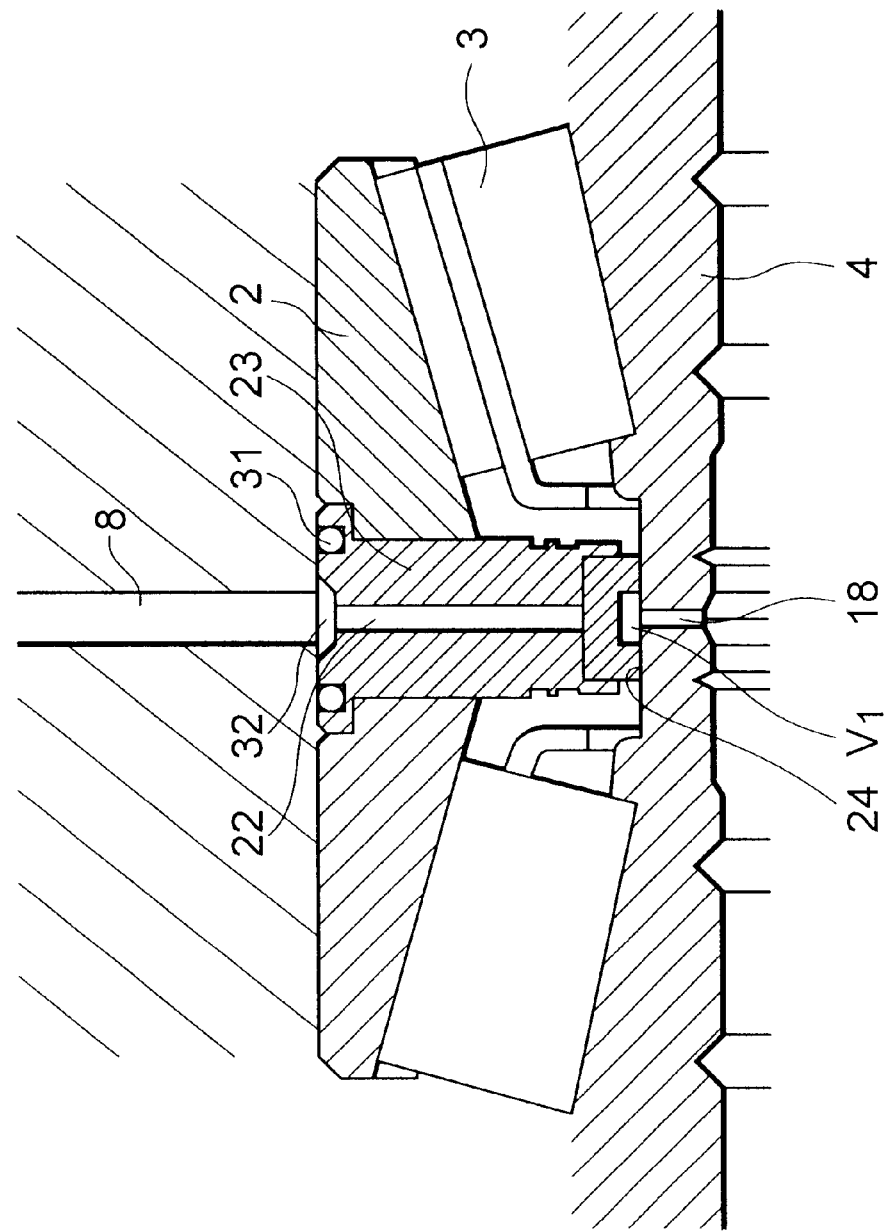
FIG. 3 is an enlarged sectional view of the essential portion of a sealed four row tapered roller bearing of a roll neck bearing assembly according to the second embodiment of the present invention.

Next, FIG. 3 shows a lubricating structure of a roll neck bearing according to a second embodiment of the present invention. In this second embodiment, it is structured such that an outer race 2 has a divided structure and a center spacer ring 23 has also a divided structure. Further, there is provided such an intermediate seal 24 which can flow the oil air into the void portion V1 from the oil groove 22 of the center spacer 23.

Figure 4:
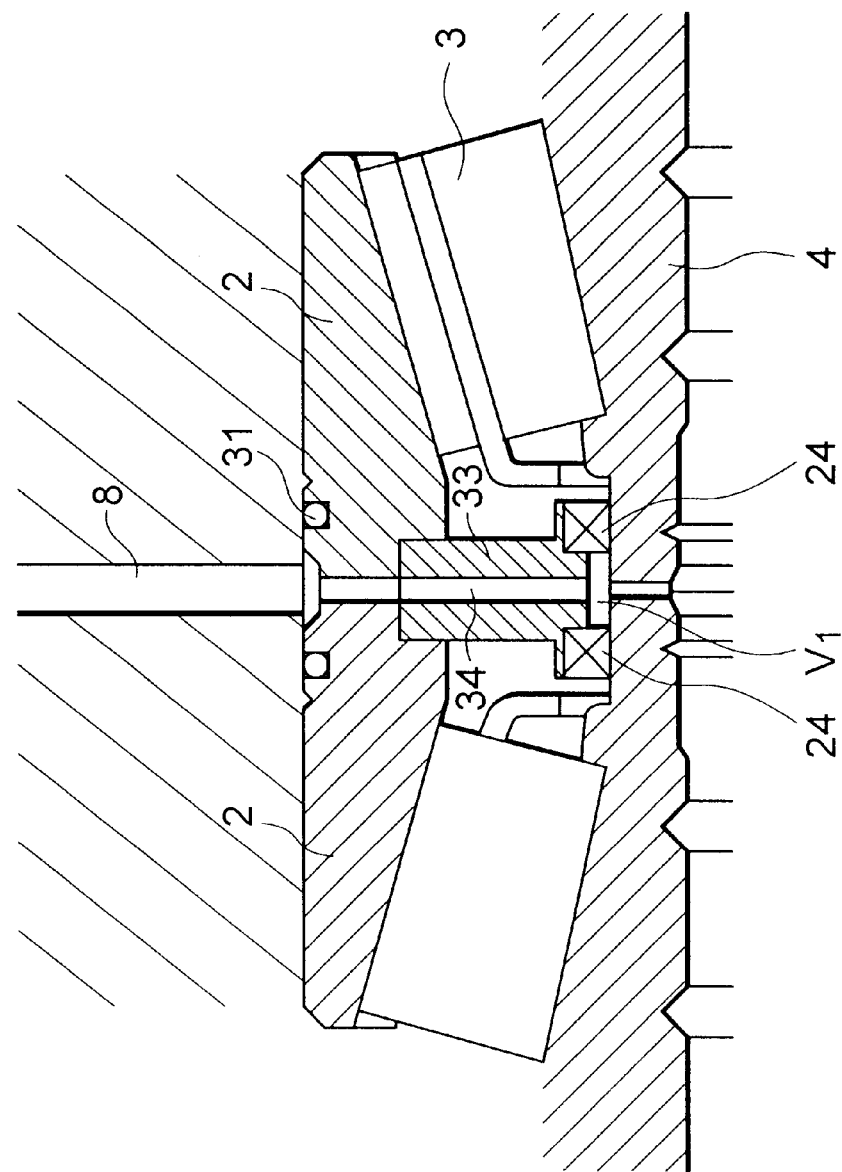
FIG. 4 is an enlarged sectional view of the essential portion of a sealed four row tapered roller bearing of a roll neck bearing assembly according to the third embodiment of the present invention.

FIG. 4 shows a lubricating structure of a roll neck bearing according to a third embodiment of the present invention. In this third embodiment, instead of the center spacer 23, a seal holder 33 having an oil bore 34 is interposed between the outer race parts 2, and the outer race 2 has a divided structure.

Figure 5:
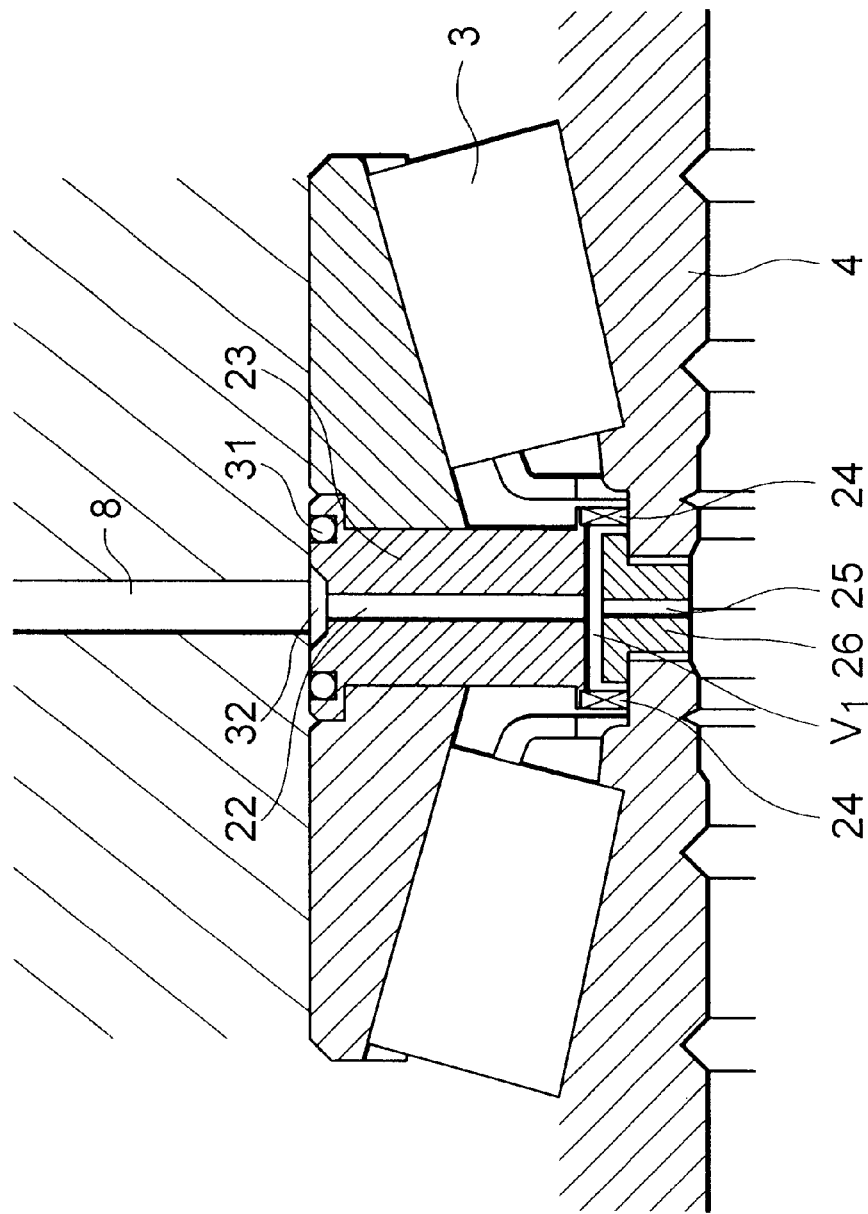
FIG. 5 is an enlarged sectional view of the essential portion of a sealed four row tapered roller bearing of a roll neck bearing assembly according to the fourth embodiment of the present invention.

FIG. 5 shows a lubricating structure of a roll neck bearing according to a fourth embodiment of the present invention. In this fourth embodiment, there is provided an inner race spacer 26 in the inner race 4 for adjusting a void inside the bearing. An inner race spacer oil bore 25 is formed through this inner race spacer 26.

Figure 6:
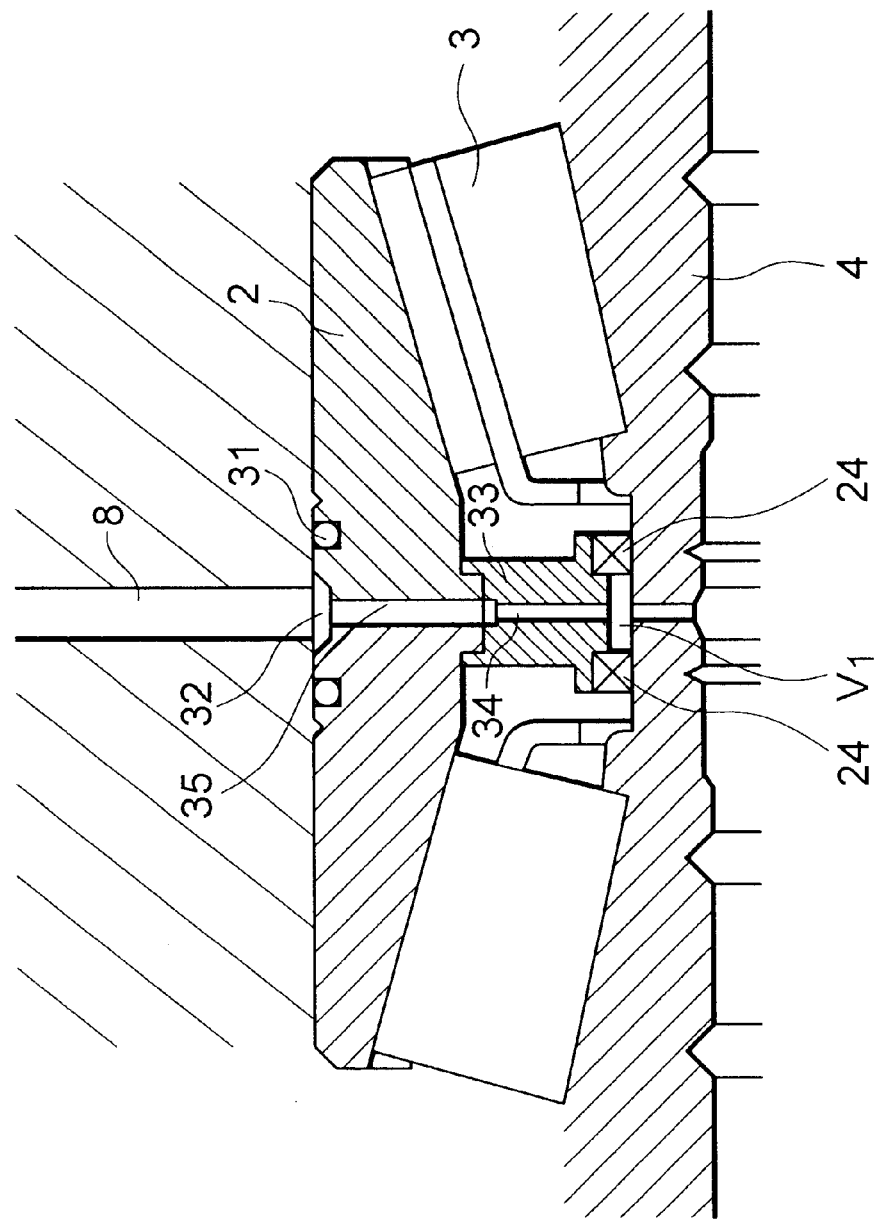
FIG. 6 is an enlarged sectional view of the essential portion of a sealed four row tapered roller bearing of a roll neck bearing assembly according to the fifth embodiment of the present invention.

Next, FIG. 6 shows a lubricating structure of a roll neck bearing according to a fifth embodiment of the present invention. In this fifth embodiment, an outer race is comprised of an integrated double row outer race 2, and an oil bore 35 is formed through the double row outer race 2. The seal holder 33 having the oil bore 34 is provided, instead of the center spacer.

FIG. 7 shows a lubricating structure of a roll neck bearing according to a sixth embodiment of the present invention. This sixth embodiment shows a four row tapered roller bearing in a roll neck bearing, which is substantially the same as the sealed four row tapered roller bearing described above, and is different therefrom chiefly in that the oil seals are not provided at the both ends of the bearing.

The present invention is not limited to the above-described embodiments, but can be variable in many ways.

As described above, according to the present invention, while supply of the oil air to the respective inner portions of the bearing such as the environs of the rolling elements is conducted through the first lubrication route, supply of the oil air to the fit portion between the internal diameter surface of the inner race and the axial portion is conducted through the second lubrication route, so that it is possible to supply the oil air to the fit portion and to prevent wear or scoring in the fit portion.

Moreover, the seal member having the predetermined void portion is interposed in the second lubrication route, and the capacity of this seal void portion is made conspicuously small, compared with that of the prior art. Thus, the pressure of the oil air flowing in this seal void portion is hardly decreased, and the flow speed of the oil air seldom decelerates to be lower than the level capable of conveying the oil. Further, the oil and the air are hardly separated from each other, and there is little pressure loss in the air due to the viscous resistance of the oil filling the seal void portion, unlike in the conventional example. As a result, it is possible to supply the oil air with certainty to the fit portion through the second lubrication route, and to correctly distribute the oil air through the respective distribution passages of the oil distributor.

With the above arrangements, it is possible to supply the oil air with certainty to the fit portion between the internal diameter surface of the inner race and the axial portion, and to prevent wear or scoring in the fit portion, thereby securing the long-term use of the bearing.

Since the oil air which reaches the seal void portion of the seal member flows securely into the fit portion through the oil groove on the inner race end surface, the pressure of the oil is suffice if being 0.1 to 0.3 bars or less. And the seal member may have a small cross section with light contacting performance and low rigidity. As a result, it is possible to design the seal holder with a smaller space, so as to improve the load capacity of the bearing, compared with the case of the conventional grease lubrication.

What is claimed is:

1. A lubricating structure of a bearing for lubricating a bearing by supplying oil air which is transmitted with pressure through respective distribution passages of an oil air distributor from an oil air supply apparatus to the bearing, comprising:

a first lubrication route for supplying said oil air to the bearing to lubricate inner portion of the bearing; and a second lubrication route for supplying said oil air to the bearing, and leading this oil air to a fit portion between the internal diameter surface of the inner race and the shaft portion through a seal member having a predetermined void portion, thereby lubricating this fit portion, and wherein a cross-section area A of a lubricating passage composing the second lubricating route satisfies the following formula:

$$V = Q/A \geq 6 \text{ m/s}$$

where V is a velocity of the oil air in the lubricating passage; and
   Q is an amount of supply of the oil air.

2. A lubricating structure of a bearing for lubricating a bearing by supplying oil air which is transmitted with pressure through respective distribution passages of an oil air distributor from an oil air supply apparatus to the bearing, comprising:

a first lubrication route for supplying said oil air to the bearing to lubricate inner portion of the bearing; and a second lubrication route for supplying said oil air to the bearing, and leading this oil air to a fit portion between the internal diameter surface of the inner race and the shaft portion through a seal member having a predetermined void portion, thereby lubricating this fit portion, wherein said bearing comprising a plurality of outer race elements juxtaposed each other to compose a bearing outer race, a plurality of inner race elements disposed radially distant from the outer race elements and juxtaposed each other to compose a bearing inner race, and a plurality of rolling elements disposed in a bearing space formed between said outer race elements and said inner race elements;

a first outer race spacer disposed between the neighboring outer race elements and extending radially inwardly to said bearing space, said first outer race spacer being formed with a first lubricating passage communicating with one of said distribution passages and opening to said bearing space; the first lubricating passage forming said first lubricating route;

a second outer race spacer disposed between the other neighboring outer race elements and extending radially inwardly to the neighborhood of said inner race, said second outer race spacer having a second lubricating passage which communicates with the other of said distribution passage and opens radially inwardly;

seal element disposed between said second outer race spacer and said inner race element radially opposed thereto to form a sealed space separated from said bearing space;

said inner race being formed with a third lubricating passage which communicates with said sealed space and opens to said fit portion; and said second lubricating passage of said second outer race spacer, said sealed space and said third lubricating passage formed through said inner race composing of said second lubricating route, and wherein a cross-section area A of a lubricating passage composing the second lubricating route satisfies the following formula:

$$V = Q/A \geq 6 \text{ m/s}$$

where V is a velocity of the oil air in the lubricating passage; and
   Q is an amount of supply of the oil air.

* * * * *